(12) United States Patent
Shah et al.

(10) Patent No.: US 9,135,671 B2
(45) Date of Patent: Sep. 15, 2015

(54) SECURED COMPUTER BASED ASSESSMENT

(75) Inventors: Viral Prakash Shah, Mumbai (IN); Shaikh Mohammed Nawaz, Mumbai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 50 days.

(21) Appl. No.: 13/607,359

(22) Filed: Sep. 7, 2012

(65) Prior Publication Data

US 2013/0309644 A1 Nov. 21, 2013

(30) Foreign Application Priority Data

May 15, 2012 (IN) .......................... 1478/MUM/2012

(51) Int. Cl.
*G09B 3/00* (2006.01)
*G06Q 90/00* (2006.01)
*G09B 7/00* (2006.01)

(52) U.S. Cl.
CPC . *G06Q 90/00* (2013.01); *G09B 7/00* (2013.01)

(58) Field of Classification Search
CPC ........................................................ G09B 3/00
USPC ........................................................ 434/350
See application file for complete search history.

(56) References Cited

U.S. PATENT DOCUMENTS

| 7,257,557 | B2 | 8/2007 | Hulick | |
|---|---|---|---|---|
| 2004/0229199 | A1* | 11/2004 | Ashley et al. | 434/323 |
| 2007/0111185 | A1* | 5/2007 | Krebs | 434/350 |
| 2011/0111383 | A1* | 5/2011 | Srinivasan et al. | 434/322 |
| 2011/0217685 | A1* | 9/2011 | Srinivasan et al. | 434/323 |

* cited by examiner

*Primary Examiner* — Sam Yao
*Assistant Examiner* — Robert P Bullington
(74) *Attorney, Agent, or Firm* — Seed IP Law Group PLLC

(57) ABSTRACT

System and methods for secured computer based assessment are described. In one embodiment, the method comprises receiving a question paper from an assessment conduction center, wherein the question paper contains dummy content having structure similar to an actual content of the question paper. A question paper metadata template containing metadata of the actual content that is generated based on the dummy content is created, and provided to the assessment conduction center for loading the actual content of the question paper in the question paper metadata template to generate an examination paper for distribution to one or more exam centers. A response of each of a plurality of aspirants corresponding to the examination paper is obtained from the one or more exam centers and said response is evaluated based on the metadata of the actual content, to generate a result for each of the plurality of aspirants.

15 Claims, 2 Drawing Sheets

SECURED COMPUTER BASED ASSESSMENT

TECHNICAL FIELD

The present subject matter relates, in general, to computer based assessments, and particularly, but not exclusively, to systems and methods for conducting a secured computer based assessment.

BACKGROUND

A standard procedure used in almost all the environments, such as academic and corporate environment, for measuring a candidate's competency is through assessments or examinations. Due to added cost and complexity of traditional paper based assessments, computer based assessments, typically referred to as online assessments, have emerged as a popular and convenient method for administering and processing the assessments. For example, assessments that are conducted at a large scale, such as GRE, GMAT, SAT, TOEFL, LSAT, CAT, AIEEE, and other similar assessments that require more time and efforts in administration and processing are now conducted online.

The general acceptability of computer based assessments in academic as well corporate sectors is mostly due to ease of use and reduced time and effort in conduction and evaluation of the assessments. However, increasing use of online assessment has given rise to a number of issues related to security and integrity of the assessment. Maintaining integrity of the assessment becomes even more burdensome when the assessment is conducted at a large scale at several distributed examination centers.

SUMMARY

This summary is provided to introduce concepts related to method(s) and system(s) for conducting a secured computer based assessment, which is further described below in the detailed description. This summary is neither intended to identify essential features of the claimed subject matter nor is it intended for use in determining or limiting the scope of the claimed subject matter.

System(s) and method(s) for conducting a secured computer based assessment by an assessment assistance center are described herein. In one implementation, the method includes receiving the question paper from the assessment conduction center, wherein the question paper contains dummy content having structure similar to actual content of the question paper. The method further includes, creating a question paper metadata template containing metadata of the actual content that is generated based on the dummy content, wherein the question paper metadata template is provided to the assessment conduction center for loading the actual content of the question paper in the question paper metadata template to generate an examination paper for distribution to one or more exam centers. Further in an implementation, the method includes obtaining a response of each of a plurality of aspirants corresponding to the examination paper from the one or more exam centers and evaluating the response of each of the plurality of aspirants based on the metadata of the actual content, to generate a result for each of the plurality of aspirants.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
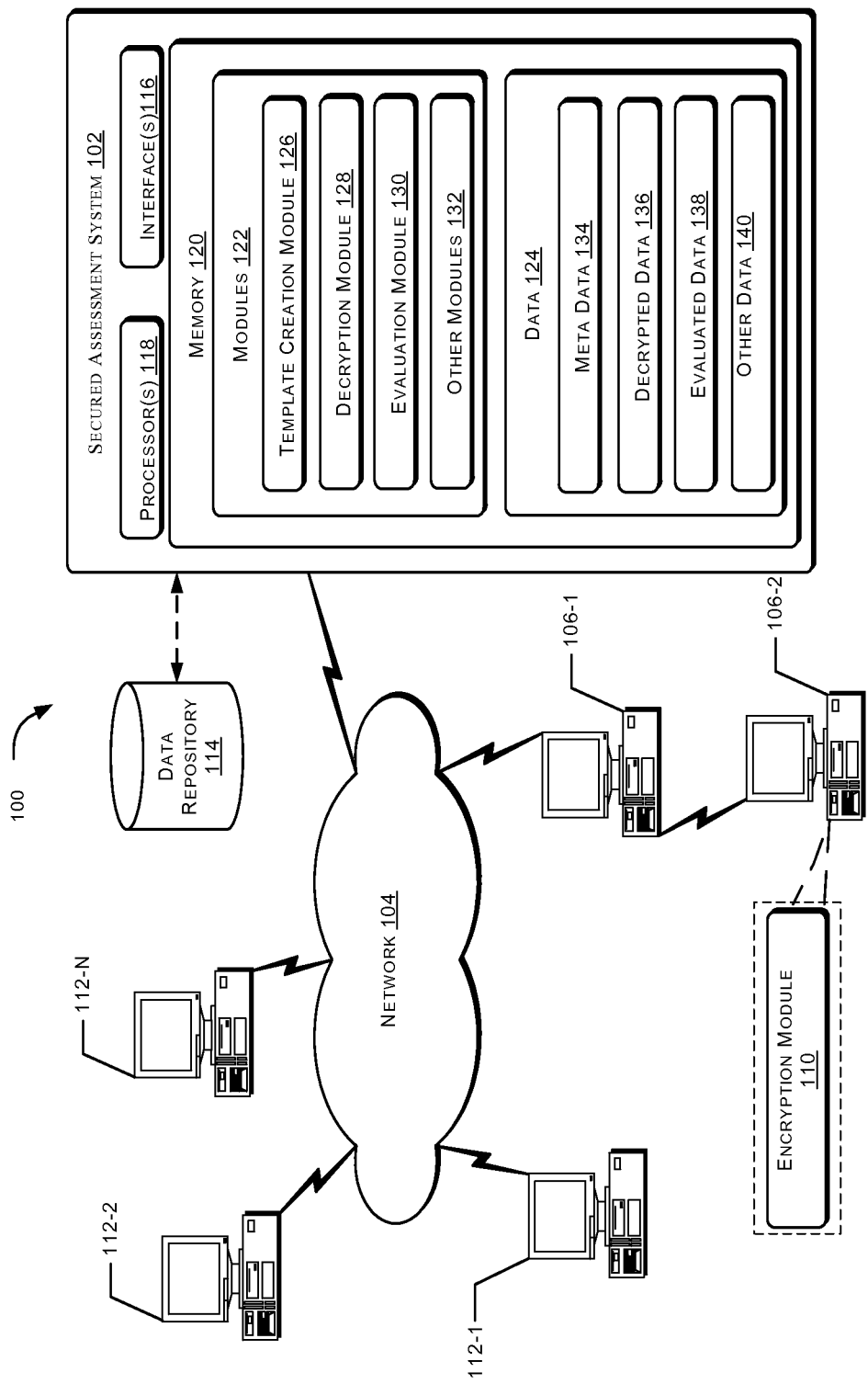
FIG. 1 illustrates a networking environment implementing a secured assessment system, in accordance with an embodiment of the present subject matter.

In the recent years, computer based assessment has emerged as a popular and widely adopted mode of conducting various academic and corporate assessments. Computer based assessment is generally a mode of assessment where questions appear on the screen of a computing system and aspirants submit their answers using an input device, such as keyboard and/or mouse. Such type of assessment offers significant advantages over traditional paper based assessments, like flexibility, agility, efficiency, reduced time in evaluation, and cost savings in printing, storage, and transportation of the question papers to distributed examination centers.

Conducting such computer based assessment at a large scale typically involves interaction of multiple parties or centers. Such centers may include a center conducting the assessment like an educational body, such as schools, institutions, and colleges, for admitting students and, hiring faculty, or a recruitment agency, a firm like a bank or a government body like public sector undertakings for hiring employees, promoting employees, appraisal purposes, etc. The center conducting the assessment (hereinafter referred to as assessment conduction center) sets a question paper containing content, such as multiple choice questions, multi-select questions, comprehension/paragraph based multiple choice questions, multiple levels of difficulty, different number of questions, different number of sections, cut-off's, duration of the assessment, and the like. After having set the question paper, the assessment conduction center forwards the question paper to another center, such as an IT/software firm, which provides assistance in conducting and evaluating the assessment. Such centers are referred as assessment assistance centers henceforth.

Owing to the complexity of conduction and evaluation of the assessments for a large number of aspirants, the assessment conduction centers are largely dependent on such assessment assistance centers. The assessment conduction centers therefore share the assessment content, i.e., questions and correct answers, with the corresponding questions, and instructions pertaining to the assessment with the assessment assistance center to enable the assessment assistance center to conduct and evaluate the assessment on their behalf.

The assessment content and instructions provided by the assessment conduction center is stored in a database maintained by the assessment assistance center. The assessment assistance center prepares an examination paper based on the content received from the assessment conduction center, and transfers the examination paper to designated exam centers where the assessment takes place. The transfer of the assessment may take place over a network like internet. A plurality of aspirants take the assessment via computing systems allocated to them in the respective exam centers, and submit their responses to the questions, which is recorded/stored by the exam centers, and are transferred to the assessment assistance center at the end of the assessment, over a network like internet. As indicated previously, the questions and corresponding answers are stored in the database maintained by the assessment assistance center, and evaluation of the responses submitted by the aspirants' takes place at the assessment assistance center based on comparison of the submitted answers with the corresponding answers stored in the database. Result of the evaluation is then provided to the aspirants in form of score cards.

Sharing of the content of the assessment with the assessment assistance centers, however, poses a risk to the security and confidentiality of the content. To address the security issues, various measures has been taken in the past by the assessment conduction centers, such as signing a non-disclosure agreement with the assessment assistance center, transferring the content to the assessment assistance center via a secured network, and encrypting the content before it is transferred to the assessment assistance centers. Further, security measures have been taken by the assessment assistance center, such as storing the content related to the assessment in the database in an encrypted format. Further, to maintain the decorum of the assessment, authorized personnel from the assessment conduction center and the assessment assistance center are sent to the exam centers. After the assessment is over, the responses of the aspirants are forwarded to the assessment assistance center through a secured network. However, such security measures have failed to ensure the complete security and integrity of the assessment content, as hackers or intruders may find several ways to intercept such assessment content in case of digital transfer and in case of physical transfer, the credibility of the personnel involved is at stake. These factors are to be accounted for maintaining the integrity of the assessments, but the conventional approaches fail to comply with such measures.

In accordance with the present subject matter, systems and methods are provided for conducting a secured computer based assessment, wherein the assessment can be conducted without sharing of actual content of the assessment, such as questions and their corresponding answers, between the assessment conduction centers and the assessment assistance centers. The non-sharing of the actual content ensures security and integrity of the assessment. Further to non-sharing of the actual content, the responsibility of preparation and encryption of the assessment and transfer of the assessment to the exam centers lies with the assessment conduction center. Further, the actual content is restricted to an internal database of the assessment conduction center and is not distributed over multiple networks; and therefore the actual content of the assessment is secured from intrusions and hacking.

In one embodiment, the present subject matter provides for preparing a computer based assessment following a secured and tamper-proof procedure, and evaluation of the secured computer based assessment. In said embodiment, the assessment conduction center downloads a question paper template form the assessment assistance center over a secured network, such as a virtual private network (VPN). Based on the question paper template, the assessment conduction center creates a question paper containing dummy content therein. The dummy content includes fake questions and answers, and meta information. The meta information includes type of questions, level of difficulty, number of questions, number of sections, cut-off's, duration of assessment, etc. Though the questions and answers provided as a part of the dummy content are fake or unreal, but the meta information which is representative of the structure of the dummy content is similar to that of the actual content. Therefore, in the context of the present subject matter, the term 'dummy content' has been referred to indicate that the questions and answers that generally captures the major portion of the question paper are fake, however, meta information indicative of the structure of the dummy content is similar to the actual content. Once created, the assessment conduction center uploads such question paper with dummy content into the assessment assistance center.

Upon receiving the question paper with the dummy content, the assessment assistance center generates metadata for the actual content based on the structural information or meta information acquired from the dummy content. The assessment assistance center further creates a question paper metadata template containing the generated metadata. In an example, the generated metadata includes various identifiers (id), such as question no. id, question id, options id, correct option(s) id, section id, subject id, language id, configuration id, etc. The question paper metadata template can be in form of an excel sheet containing the meta id's. The question paper metadata template, thus, created can be provided to the assessment conduction center over the secured network.

The assessment conduction center then loads the actual content of the question paper in the question paper metadata template without modifying the metadata contained therein, to generate an examination paper. The actual content may include original questions and options in case of multiple choice assessments, and other original information related to the assessment. The term 'examination paper' therefore refers to a question paper metadata template loaded with the actual content of the assessment. Such an examination paper is then encrypted by the assessment conduction center, and may be further protected by a password. Such a password protected encrypted examination paper, which is henceforth referred to as a protected examination paper, is distributed to several exam centers dispersed at various geographical locations at a preset time, for example, 30 minutes prior to the assessment. The mode of distribution may include physical distribution of the protected examination paper in a removable media, such as a pen-drive or CD/DVD, or electronic distribution through the secured network.

At the exam centers, the protected examination paper is unlocked upon receiving the password from the assessment conduction center, decrypted, and made available for the assessment. The examination paper is provided to the plurality of aspirants on their respective computing systems, and the responses provided by the aspirants are stored locally at the exam centers, and transferred to the assessment assistance center after the assessment. The assessment assistance center evaluates the responses of the aspirants based on the metadata stored in their database and provides the result of the evaluation to the aspirants. Thus, the assessment assistance center is capable of evaluating the assessment based on the metadata, without having the actual content of the assessment.

The above method(s) and system(s) are further described in conjunction with the following figures. It should be noted that the description and figures merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

FIG. 1 illustrates a network environment 100 implementing a secured assessment system 102, according to an embodiment of the present subject matter. The secured assessment system 102, hereinafter referred to as the SAS 102, is configured for conducting a secured computer based assessment. In an implementation, the SAS 102 is implemented within an assessment assistance center. The assessment assistance center can be an IT/software firm or a specialized agency involved in such practice.

The SAS 102 is communicatively coupled, over a network 104, to an assessment conduction center machine 106-1, hereinafter referred to as ACOM 106-1. In an implementation the SAS 102 may be connected to the ACOM 106-1 over a secured Virtual Private Network (VPN). The ACOM 106-1 may be further connected to another assessment conduction center machine 106-2, hereinafter referred to as ACOM 106-2 over a local area network (LAN). In an implementation, the ACOM 106-2 includes an encryption module 110. In another implementation, the encryption module 110 may also be present in the ACOM 106-1. The encryption module 110 is configured to create, encrypt, proof-read and store a question paper with actual content pertaining to the assessment.

In an implementation, the ACOM 106-1 and the ACOM 106-2 are implemented at an assessment conduction center. The assessment conduction center, as mentioned earlier, may include an educational body, like schools and colleges, that conducts tests for admitting students, conducting examinations and hiring faculty, or a recruitment agency like a bank, a government body like public sector undertakings that conduct tests for hiring employees, promoting employees, appraisal purposes etc. It is to be understood that FIG. 1 depicts only two machines, ACOM 106-1 and the ACOM 106-2 at the assessment conduction center for the ease of explanation; however, the same should not be construed as a limitation, and multiple machines may be deployed at the assessment conduction center.

Further, the SAS 102 is communicatively coupled, over the network 104, to exam center machines 112-1, 112-2 . . . 112-N, hereinafter collectively referred to as ECM 112. In an implementation, the ECM 112 is implemented within an exam center. The exam center, as mentioned earlier, is a place where the plurality of aspirants gathers on a specific date and time as communicated by the assessment conduction center to appear for the assessment. The exam center provides the plurality of aspirants with computing systems on which the assessment is conducted and aspirants provide their responses against the questions received by them. The ACOM 106-1, the ACOM 106-2, and the ECM 112 may be a computing device, such as a hand-held device, a laptop or other portable computer, a tablet computer, a mobile phone, a PDA, a smartphone, and a desktop computer.

The SAS 102 may be implemented in a computing device, such as a hand-held device, a laptop or other portable computer, a tablet computer, a mobile phone, a PDA, a smartphone, and a desktop computer. The SAS 102 may also be implemented in a workstation, a mainframe computer, a server, and a network server. Further, the SAS 102 is connected to a data repository 114. Although, FIG. 1 depicts only one data repository 114, in an implementation, the SAS 102 may be communicatively coupled to more than one data repositories. Further, the data repository 114 is depicted as an external repository communicatively coupled to the SAS 102. It is to be understood that the data repository 114 may also be implemented as an internal repository within the SAS 102.

The network 104 may be a wireless or a wired network, or a combination thereof. In an example, the network 104 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 104 may include a variety of network devices, including routers, bridges, servers, computing devices, storage devices. The network devices within the network 104 may interact with the SAS 102 through communication links.

In one embodiment, the SAS 102 includes interface(s) 116, one or more processor(s) 118, and a memory 120 coupled to the processor(s) 118. The interfaces 116 may include a variety of software and hardware interfaces, for example, interfaces for peripheral device(s), such as a keyboard, a mouse, an external memory, a camera device, and a printer. Further, the interfaces 116 may enable the SAS 102 to communicate with other devices, such as web servers and external databases. The interfaces 116 can facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 116 may include one or more ports for connecting a number of computing systems with one another or to another server computer.

The processor(s) 118 can be a single processing unit or a number of units, all of which could include multiple computing units. The processor 118 may be implemented as one or more microprocessors, microcomputers, microcontrollers, digital signal processors, central processing units, state machines, logic circuitries, and/or any devices that manipulate signals based on operational instructions. Among other capabilities, the processor 118 is configured to fetch and execute computer-readable instructions and data stored in the memory 120.

The memory 120 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 120 also includes module(s) 122 and data 124.

The modules 122, amongst other things, include routines, programs, objects, components, data structures, etc., which perform particular tasks or implement particular abstract data types. The modules 122 further include a template creation module 126, a decryption module 128, an evaluation module 130 and other module(s) 132. The other modules 132 may include programs that supplement applications on the SAS 102, for example, programs in the operating system. On the other hand, the data 124 serves, amongst other things, as a repository for storing data processed, received, and generated by one or more of the modules 122. The data 124 includes metadata 134, decrypted data 136, evaluated data 138, and other data 140. The other data 140 includes data generated as a result of the execution of one or more modules in the other modules 132.

According to the present subject matter, the SAS 102 is configured for conducting a secured computer based assessment. In an implementation, a user may access the SAS 102 through the ACOM 106-1 for the purpose of preparing the secured assessment. For the purposes of the description herein, the user may be understood as a professional like an administrator, a faculty or an official of the assessment conduction center having necessary credentials and access to the ACOM 106-1. In an implementation, the user is provided with a user interface, such as a graphic user interface (GUI), which may be used for the purposes of preparing the secured computer based assessment.

In one implementation, the user may request the SAS 102 for a question paper template for the purpose of creating a question paper. In response to such request, the SAS 102 provides a question paper (QP) template to the user. The user may download the QP template and stores it locally on the ACOM 106-1 through the network 104. As described earlier, the user creates a QP with dummy content using the QP template. The dummy content may include at least fake or dummy questions-answers and meta information that is representative of the structure to the dummy content. The meta information includes type of questions, level of difficulty, number of questions, number of sections, cut-off's, duration of assessment, etc. Further, the meta information provided as a part of the dummy content is similar to that of the actual content. In other words, structure of the dummy content is similar to that of the actual content. For example, the dummy content may include an objective type "Question-1" with five options as 'a', 'b', 'c', 'd', and 'e' with correct answer as option 'd', in "Section-A" of "Subject-X". Thus, structure of the dummy content may be as follows:

| Subject-X |
| --- |
| Section-A |
| Question-1: Theory of relativity belongs to? |
| a. Newton |
| b. Galelio |
| c. Pascal |
| d. Einstein |
| e. None |
| Correct answer: d |

While, the actual content may include an objective type "Question-1" with five options as 'p', 'q', 'r', 's', 't' with correct answer as option 's', in "Section-B" of "Subject-General Knowledge". Thus, structure of the dummy content may be as follows:

| Subject-General Knowledge |
| --- |
| Section-B |
| Question-1: EL-NINO and LA-NINA are types of? |
| p. Earthquakes |
| q. Volcanoes |
| r. Avalanches |
| s. Monsoon |
| t. None |
| Correct answer: s |

In the above cited example, the 'Subject-X' of the dummy content is similar in structure to the 'Subject-General Knowledge' of the actual content, but subject name mentioned in the dummy content is fake. Likewise, 'Section-A' of the dummy content is similar in structure to the 'Section-B' of the actual content, but the section mentioned in the dummy content is fake. Also, the question and options mentioned in the dummy content has structure similar to the actual content having same number of questions, options, and correct option number. As an instance, the correct option in dummy content is option number 4, which is also the case with the actual content having correct option as option number 4. However, the question, options and correct option text in the dummy content are fake, while it is correct in the actual content.

It is to be understood that the example cited above is only for the purpose of explanation, it should not be construed as a limitation. Structure, format, number of questions/options, and type of questions and the like may vary. For example, question paper may include multiple choice questions, multi-select questions, and comprehension/paragraph based multiple choice questions.

The question paper, which is in short referred to as 'QP' in the description containing the dummy content, thus, include fake question-answers and other additional fake content, such as fake subject and fake section, but broadly covers the structural features of the QP with actual content. The user uploads the QP with dummy content back to the SAS 102.

In an implementation, the QP with dummy content is received by the template creation module 126 in the SAS 102. The template creation module 126 is configured to identify the structural features of the questions from the QP with dummy content as provided by the user. As described earlier, the template creation module 126 is further configured to create a QP metadata template based on the structural information/meta information acquired from the QP with dummy content. The QP metadata template contains metadata 134 generated by the template creation module 126 as designated fields and spaces called meta identities (meta id's) corresponding to the structural information obtained from the dummy content. In an example, the meta id's include question no. id, question id, options id, correct option id, section id, subject id, language id, configuration id, etc. Further in an example, the question paper metadata template can be an excel sheet containing the meta id's. The data corresponding to the QP with dummy content as received by the template creation module 126 and the QP metadata template as created by the template creation module 126 is stored as the metadata 134.

Referring to the example cited in the foregoing description, following meta ids may be generated: meta id 'FSB001' may be generated for 'Subject', meta id 'FSC002' may be generated for 'Section', meta id 'FSQ003' may be generated for 'Question', meta ids 'FSO001', 'FSO002', 'FSO003', 'FSO004', and —'FSO005' for Options, and meta id 'FCO001' for Correct option. In one implementation, single id can be specified as correct option in case of multiple choice questions, and more than one id can be specified as correct options in case of multi-select questions.

Further, the user of the ACOM 106-1 accesses the metadata 134 in the SAS 102 through the network 104 and downloads the QP metadata template on the ACOM 106-1. As described earlier, the ACOM 106-1 is connected to the ACOM 106-2 through a local network. The QP metadata template is transferred from the ACOM 106-1 to the ACOM 106-2 for further processing. In one implementation at the ACOM 106-2, as described earlier, the user fills the QP metadata template with actual content of the question paper without modifying the metadata, i.e., meta-ids contained in the QP metadata template. The actual content includes, for example, real questions and options that are intended to be provided for the assessment. In another implementation, the user may receive a pool of questions as a question bank from the ACOM 106-1 along with a set of predefined extraction rules for retrieving the questions out of the question bank, and the QP metadata template. The question bank, in one example, includes a large number of questions; say, one thousand questions under different sections, say, section A-section Z, with varying scores, such as 1 mark questions, 5 marks questions further categorized based on level of difficulty as 'easy', 'average' and 'difficult'. The predefined extraction rules are indicative of selection criteria for retrieving the questions from the question bank in order to fill the QP metadata template. Such retrieved questions correspond to actual content of the question paper. In addition to the retrieved questions, other details such as actual section, subject name, etc., may be filled into the QP metadata template by the user. Based on the predefined extraction rules, the user of the ACOM 106-2 may retrieve the questions from the question bank and fill the retrieved questions in the QP metadata template to generate an examination paper. In one, an extraction module (not shown in the figure) may be provided within an offline application local to the ACOM 106-2. In said implementation, the extraction module retrieves the questions from the question bank based on the predefined extraction rules and the retrieved questions are filled in the QP metadata template to generate an examination paper.

The examination paper, thus, generated may be encrypted by the encryption module 110 resides in the offline application installed on the ACOM 106-2. The encryption module 110 encrypts the examination paper using 128 bit Advanced Encryption Standard (AES). In one implementation, other conventionally known encryption procedures may be used for encryption. The encryption module 110 further saves the examination paper as a bundle folder, for example, a ZIP/RAR encrypted folder, hereinafter referred to as an encrypted examination paper. The encrypted examination paper may be further protected by a password which is set by the user. Such a password protected encrypted examination paper is referred to as a protected examination paper, henceforth.

In one implementation, the encryption module 110 is configured to proof read the protected examination paper based on instructions received from the user on ACOM 106-2. During proof read, the encryption module 110 performs a dry run of the protected examination paper and makes the examination paper viewable to the user either in a suitable viewable format, such as HTML page, or as a real time interface as received by an aspirant of the examination paper. Such a proof reading enables the user to identify proper functionality and flaws, if any, in the examination paper, so that the same can be rectified before finalizing, encrypting and protecting the examination paper.

According to an embodiment, the user on the ACOM 106-2 transfers the protected examination paper to the exam center at a preset time. In an implementation, the preset time is decided among the assessment conduction center and the exam center on a confidentiality basis. For example, the preset time may be 30 minutes prior to the assessment. The protected examination paper can be transferred in a removable media for example, a pen-drive or CD/DVD, etc., or through the network 104. At the exam center the protected examination paper and the password is received by an authorized examination center official having necessary credentials and in turn by the ECM 112. As described earlier, the ECM 112 is connected to the SAS 102 through the network 104. The ECM 112 transfers the protected examination paper to the SAS 102.

In the SAS 102, the protected examination paper is received by the decryption module 128. In an implementation, the decryption module 128 is configured to receive the password from the ECM 112 and decrypt the encrypted examination paper and obtain the examination paper. The data corresponding to the encrypted examination paper as received by the decryption module 128 and the examination paper obtained after decrypting the encrypted examination paper by the decryption module 128 is stored as the decrypted data 136.

Further, in an implementation, the SAS 102 provides the decrypted data 136 to the ECM 112 through the interface 116 over the network 104. At the ECM 112, the plurality of aspirants receives the decrypted data 136 as the examination paper for the assessment at the preset time. The plurality of aspirants attempts the examination paper with responses, and the responses are stored at the ECM 112 during the assessment. After the assessment, the responses of the plurality of aspirants are forwarded to the SAS 102.

In the SAS 102, the responses of the plurality of aspirants are received by the evaluation module 130. In an implementation, the evaluation module 130 is configured to evaluate the responses of the plurality of aspirants based on the metadata 134. For example, with reference to the example cited earlier, the metadata 134 pertaining to the dummy content with options 'a', 'b', 'c', 'd', and 'e' with correct answer as option 'd' is known to the evaluation module 130 and the responses to the actual content with options 'p', 'q', 'r', 's', 't' is received by the evaluation module 130. On the basis of this, the evaluation module 130 infers the correct option as 's' in the actual content and further evaluates on the basis of which aspirant has or hasn't marked/clicked 's' as his response. Referring to the example mentioned in the foregoing description, the meta id 'FCO001' for the correct option is known to the evaluation module 130 from the metadata 134. The meta id 'FCO001' is associated with option 's', since 's' is the correct answer for the actual content question as described earlier. Therefore, if the meta id 'FCO001; is received by the evaluation module 130 as the aspirant response, then it is inferred that the aspirant has marked/clicked 's' as his response, which is the correct answer. In case, a meta id other than 'FCO001' is received by the evaluation module 130, then it is inferred that the aspirant has not marked/clicked 's' as his response. Thus, the response provided by the aspirant to this question is evaluated as incorrect.

The evaluation module 130 is further configured to generate results of the plurality of aspirants based on the evaluation of the responses. The data corresponding to the responses of the plurality of aspirants as received by the evaluation module 130 and the results generated by the evaluation module 130 is stored as the evaluated data 138, which may be provided to the aspirants. In one implementation, a detailed answer sheet containing questions and their respective answers as attempted by the aspirant can be provided to the aspirants upon obtaining the question paper along with answers from the assessment conduction center after the assessment. For example, such a detailed answer sheet may be provided to the aspirants, in case any Right-to-Information (RTI) queries are raised by the aspirants.

Figure 2:
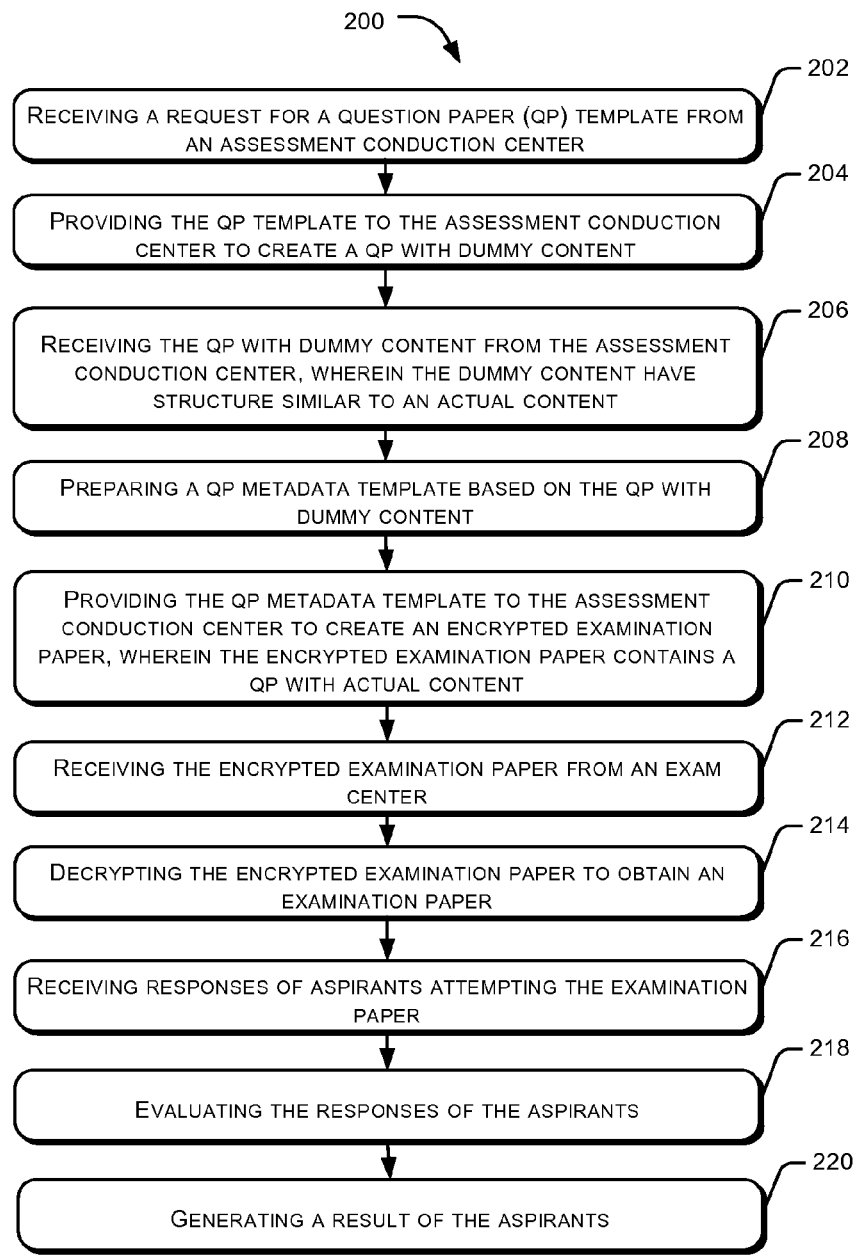
FIG. 2 illustrates a method for conducting a secured computer based assessment, in accordance with an embodiment of the present subject matter.

FIG. 2 illustrates a method 200 for conducting a secured computer based assessment, in accordance to an embodiment of the present subject matter. The method 200 is implemented in computing device, such as a system. The method 200 may be described in the general context of computer executable instructions. Generally, computer executable instructions can include routines, programs, objects, components, data structures, procedures, modules, functions, etc., that perform particular functions or implement particular abstract data types. The method 200 may also be practiced in a distributed computing environment where functions are performed by remote processing devices that are linked through a communications network.

The order in which the method 200 is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the method can be implemented in any suitable hardware, software, firmware, or combination thereof.

At block 202, a request for a question paper (QP) template is received by the assessment assistance center. In one implementation the assessment conduction center requests the assessment assistance center for the QP template over a secured network, such as a virtual private network (VPN). In one implementation, the template creation module 126 of the secured assessment system 102 implemented at the assessment assistance center receives such a request.

At block 204, the assessment assistance center provides the QP template to the assessment conduction center for creating a QP. In one implementation, the template creation module 126 provides the QP template to the assessment conduction center over the secured network.

At block 206, the QP with dummy content is received by the assessment assistance center from the assessment conduction center. As indicated previously, the assessment assistance center provides the QP template to the assessment conduction center for creating the QP. Upon receiving the QP template, the assessment conduction center fills the QP template with dummy content to create the QP, and transfers the QP to the assessment assistance center via the secured network. As described earlier, the dummy content may include unreal or fake questions-answers and meta information. Thus, the assessment conduction center does not share actual content of the QP with the assessment assistance purpose. The dummy content as described herein has a structure similar to the structure of the actual content. In order words, meta information of the dummy content is similar to the meta information of the actual content.

At block 208, a QP metadata template is prepared by the assessment assistance center based on the QP with dummy content. In one implementation, the template creation module 126 generates metadata for the actual content based on the dummy content. The metadata referred herein includes meta ids, such as question no. id, question id, options id, correct option id, section id, subject id, language id, configuration id etc., which is generated based on the structural information/meta information of the dummy content. In one implementation, the template creation module 126 generates the metadata for the actual content and creates the QP metadata template containing such metadata.

At block 210, the QP metadata template is provided to the assessment conduction center by the assessment assistance center. In one implementation, the template creation module 126 share the QP metadata template with the assessment conduction center over the secured network. At the assessment conduction center, such a QP metadata template is loaded with actual content, such as real or original questions and other information like options in case of multiple choice assessments, images pertaining to the questions like graphs and tables, etc. For example, a user, such as a faculty member at the assessment conduction center may load the actual content in the QP metadata template to create an examination paper for assessment. In one implementation, the actual content may be randomly retrieved from a question bank based on predefined extraction rules and incorporated in the QP metadata template without modifying the metadata contained therein.

Such an examination paper may be encrypted at the assessment conduction center using 128 bit Advanced Encryption Standard (AES), or other conventionally known encryption techniques. The encrypted examination paper may be further protected by a password which is set by user at the assessment conduction center. Such a password protected encrypted examination paper is referred to as a protected examination paper is distributed to exam centers at a preset time prior to the assessment. The distribution mechanism may include removable media, such as pen drive and CD/DVD, a secured network, such as a Virtual private Network (VPN), or any other secured manner.

In one implementation, proof-reading of the protected examination paper may be conducted at the assessment conduction center to identify proper functionality and flaws, if any, before finalizing, and protecting the examination paper.

At block 212, the protected examination paper is received by the assessment assistance center from the exam center. In one implementation, the authorized personnel at the exam center upload the protected examination paper to the assessment assistance center and provide the password over a secured network like the VPN.

At block 214, the encrypted examination paper is decrypted by the assessment assistance center on verification of the password to make the examination paper accessible to the exam center. In one implementation, the decryption module 128 decrypts the encrypted examination paper. At the exam center the examination paper is provided to the plurality of aspirants on multiple computing systems, and the plurality of aspirants attempt the examination paper and provides their responses during the assessment.

At block 216, the responses of the plurality of aspirants attempting the examination paper is received by the assessment assistance center. In one implementation, the assessment assistance center receives the responses via an internet or a secured network. In one implementation, the evaluation module 130 receives the responses of the plurality of aspirants.

At block 218, the responses of the plurality of aspirants are evaluated by the assessment assistance center. In an implementation, evaluation of the responses by the assessment assistance center is based on the metadata available with the assessment assistance center. In one implementation, the evaluation module 130 evaluates the responses of the plurality of aspirants based on the metadata of the actual content.

At block 220, a result of the plurality of aspirants is generated based on their performance in the assessment as evaluated in the previous block. In an implementation, the result of the plurality of aspirants may be provided in form of score-cards to the aspirants. The result may specify, for example, a percentage or a percentile scored by the aspirants. In another example, the result may include detailed evaluation of the plurality of aspirants highlighting time taken for completing the assessment, time taken for a particular question, response to a particular question etc. In yet another example, the result may include providing the aspirants a detailed answer sheet, wherein the answer sheet comprises of questions and their respective answers as attempted by the aspirant. The detailed answer sheet is prepared by the assessment assistance center on receiving necessary instructions and information regarding the assessment from the assessment conduction center.

Although embodiments for the secured computer base assessment have been described in language specific to structural features and/or methods, it is to be understood that the invention is not necessarily limited to the specific features or methods described. Rather, the specific features and methods are disclosed as exemplary embodiments for secured computer based assessments.

I/We claim:

1. A method for conducting a secured computer based assessment by a secured assessment system, the method comprising:

receiving a question paper from an assessment conduction center machine by the secured assessment system, wherein the question paper contains a dummy content having a structure similar to an actual content of the question paper;

creating a question paper metadata template containing metadata of the actual content by the secured assessment system, wherein the metadata of the actual content is based on a structure of the dummy content;

providing the question paper metadata template by the secured assessment system to the assessment conduction center machine for loading the actual content of the question paper in the question paper metadata template, without modifying the metadata contained therein, to generate an examination paper for distribution to machines at one or more exam centers;

obtaining a response of each of a plurality of aspirants corresponding to the examination paper from the machines at the one or more exam centers by the secured assessment system; and evaluating the response of each of the plurality of aspirants based on the metadata of the actual content by the secured assessment system, to generate a result for each of the plurality of aspirants.

2. The method as claimed in claim 1 further comprises providing a question paper template to the assessment conduction center machine by the secured assessment system to create the question paper.

3. The method as claimed in claim 1, wherein the secured assessment system and the assessment conduction center machine are connected over a secured network.

4. The method as claimed in claim 3, wherein the secured network is a Virtual Private Network (VPN).

5. The method as claimed in claim 1, wherein the examination paper is encrypted and password protected by the secured assessment system.

6. The method as claimed in claim 5, wherein the encrypted examination paper is distributed to the machines at the one or more exam centers in a removable media.

7. The method as claimed in claim 1 further comprises decrypting the examination paper at a preset time upon receiving a request from the machines at the one or more exam centers based on a password provided by the assessment conduction center machine.

8. A secured assessment system comprising:
a processor; and
a memory coupled to the processor, the memory comprising:
a template creation module configured to:
provide a question paper template to an assessment conduction center machine for creating a question paper;
receive the question paper containing a dummy content from the assessment conduction center machine, wherein a structure of the dummy content is similar to structure of an actual content of the question paper;
generate metadata for the actual content of the question paper based on the structure of dummy content, wherein the generated metadata is embedded into a question paper metadata template; and
provide the question paper metadata template to the assessment conduction center machine for loading the actual content of the question paper into the question paper metadata template, without modifying the metadata contained therein, to generate an examination paper for distribution to machines at one or more exam centers; and
an evaluation module configured to:
evaluate a response of each of a plurality of aspirants attempting the examination paper on the machines at the one or more exam centers based on the metadata of the actual content; and
generate a result for each of the plurality of aspirants.

9. The secured assessment system as claimed in claim 8 further comprises a decryption module configured to decrypt the examination paper at a preset time upon receiving a request from the machines at the one or more exam centers based on a password provided by the assessment conduction center machine.

10. A non-transitory computer-readable medium having embodied thereon a computer program for executing a method on a secured assessment system, the method comprising:
receiving a question paper from an assessment conduction center machine, wherein the question paper contains a dummy content having structure similar to an actual content of the question paper;
creating a question paper metadata template containing metadata of the actual content, wherein the metadata of the actual content is based on the structure of the dummy content;
providing the question paper metadata template to the assessment conduction center machine for loading the actual content of the question paper in the question paper metadata template, without modifying the metadata contained therein, to generate an examination paper for distribution to machines at one or more exam centers;
obtaining a response of each of a plurality of aspirants corresponding to the examination paper from the machines at the one or more exam centers; and
evaluating the response of each of the plurality of aspirants based on the metadata of the actual content, to generate a result for each of the plurality of aspirants.

11. The non-transitory computer-readable medium as claimed in claim 10, wherein the method further comprises providing a question paper template to the assessment conduction center machine to create the question paper.

12. The non-transitory computer-readable medium as claimed in claim 10, wherein the secured assessment system and the assessment conduction center machine are connected over a secured network.

13. The non-transitory computer-readable medium as claimed in claim 12, wherein the secured network is a Virtual Private Network (VPN).

14. The non-transitory computer-readable medium as claimed in claim 10, wherein the examination paper is encrypted and password protected by the assessment conduction center machine.

15. The non-transitory computer-readable medium as claimed in claim 10, wherein the method further comprises decrypting the examination paper at a preset time upon receiving a request from the machines at the one or more exam centers based on a password provided by the assessment conduction center machine.

* * * * *